United States Patent
Uno et al.

(10) Patent No.: US 6,343,262 B1
(45) Date of Patent: Jan. 29, 2002

(54) METHOD FOR PROVIDING TWENTY-FOUR HOUR MAINTENANCE OF A MEASURING INSTRUMENT USING A PLURALITY OF SERVICING CENTERS

(75) Inventors: Toshihiko Uno; Masatomo Ishikura, both of Kyoto (JP)

(73) Assignee: Horiba, Ltd., Kyoto (JP)

(*) Notice: Subject to any disclaimer, the term of this patent is extended or adjusted under 35 U.S.C. 154(b) by 0 days.

(21) Appl. No.: 09/210,672

(22) Filed: Dec. 14, 1998

(30) Foreign Application Priority Data

Dec. 15, 1997 (JP) .............................................. 9-363608

(51) Int. Cl.[7] .............................................. G06F 11/00
(52) U.S. Cl. ........................ 702/184; 702/178; 709/200
(58) Field of Search ................................ 702/184, 178, 702/183; 714/4; 713/100, 2; 709/200, 201, 203, 223, 229

(56) References Cited

U.S. PATENT DOCUMENTS 6,256,747 B1 * 7/2001 Inohara et al. .................. 714/4

* cited by examiner

Primary Examiner—Kamini Shah
(74) Attorney, Agent, or Firm—Sughrue Mion, PLLC

(57) ABSTRACT

A method for providing twenty-four hour maintenance of a measuring instrument by outputting the data from the measuring instrument to a measuring computer, and if maintenance is needed, transmitting the data to a maintenance computer at one of a plurality of servicing centers, judging whether or not that servicing center is capable of performing the maintenance, and if it is not capable of performing the maintenance, selecting another servicing center that is capable of performing the maintenance and transmitting the measuring instrument's data to one of the maintenance computers at that servicing center, which will then perform the maintenance to the measuring instrument.

9 Claims, 2 Drawing Sheets

METHOD FOR PROVIDING TWENTY-FOUR HOUR MAINTENANCE OF A MEASURING INSTRUMENT USING A PLURALITY OF SERVICING CENTERS

BACKGROUND OF THE INVENTION

1. Field of the Invention

The present invention relates to a method for maintenance of a measuring instrument.

2. Prior Arts

Conventionally, in a case where maintenance is required due to trouble or malfunction of a measuring instrument, the user contacts a servicing center of the maker by telephone, etc., and receives information regarding countermeasures for resolving the trouble from the servicing center.

However, in a case where maintenance becomes necessary during time and date other than business hours and business days of the servicing center, the maker is unable to carry out maintenance. Furthermore, since experience and skill are required to execute such servicing, it is necessary for a man to do so. Therefore, it is difficult to automate such servicing by, for example, utilizing computers, etc. Accordingly, it is necessary that service personnel are secured during days and hours other than the business days and time zones.

SUMMARY OF THE INVENTION

It is therefore an object of the present invention to provide a method for maintenance of a measuring instrument to solve such problems.

A measuring instrument for which the method for maintenance according to the invention is applied is provided with a detector for detecting an object to be measured and for outputting a detected value, and a measurement computer which functions to control measurement of a measuring instrument (hereinafter merely called "measurement computer"). That is, the measurement computer outputs a measured value, which is the result of a measurement, on the basis of the detected value coming from the detector. The measuring instrument is provided with a measurement computer which performs at least any one of an arithmetical operations of the measured values, data processing, and control.

With the method for maintenance, information of type of the measuring instrument and requesting maintenance is transmitted from the measurement computer to one of the maintenance computers among maintenance computers respectively installed at a plurality of servicing centers, in compliance with an appointed maintenance-support program. The functions of maintenance computers are to control maintenance of the measuring instrument. After the transmission is completed, the maintenance computer judges, in compliance with a judgement program, whether or not the corresponding servicing center is able to perform maintenance on the basis of the time and date when the information is received.

On the basis of the result of the judgement, in a case where the corresponding servicing center is not able to execute maintenance, the maintenance computer selects another servicing center, which is able to execute maintenance, from various servicing centers registered in advance, on the basis of time and date and the type of the measuring instrument in compliance with a selection program. After the selection is completed, the maintenance computer transmits the information received from the abovementioned measurement computer to the maintenance computer of another servicing center in compliance with a transfer program.

Herein, as a measurement and maintenance computer, it is preferable that in the invention, a universal computer which functions as an independent computer, that is, a personal computer is used.

In the invention, "objects to be measured" include, for example, $CO_2$ in a gas, particles in air or liquid, X-rays, etc. An infrared ray detector or a radiant ray detector may be used as a "detector" for detecting the abovementioned $CO_2$, and X-rays, etc. Furthermore, a "detected value" in the invention means a data (value) which is outputted from the abovementioned detector and is not compensated or arithmetically processed.

According to the invention, since the information coming from a user is transferred to another servicing center whose time is different in a case where the maintenance computer judges that a countermeasure is not being carried out at the servicing center which received the above-mentioned information, the maker is able to perform maintenance and/or servicing even during a time and date other than the business time and date of the corresponding servicing center. Therefore, even though the maker does not secure personnel for maintenance and servicing at the respective servicing centers at all times, the maker is able to carry out a suitable and prompt servicing twenty-four hours a day. Correspondingly, the user is able to receive a twenty-four hour servicing system, resulting in an increase in the running efficiency of a measuring instrument.

BRIEF DESCRIPTION OF THE DRAWINGS

The invention can be more clearly understood on the basis of the following description of the preferred embodiment with reference to the accompanying drawings. However, the preferred embodiment and drawings are only for illustration and description and must not be utilized to define the scope of the invention. The scope of the invention is defined by only the claims thereof.

DETAILED DESCRIPTION OF PREFERRED EMBODIMENT

Hereinafter, a description is given of a preferred embodiment of the invention with reference to the accompanying drawings.

Figure 1:
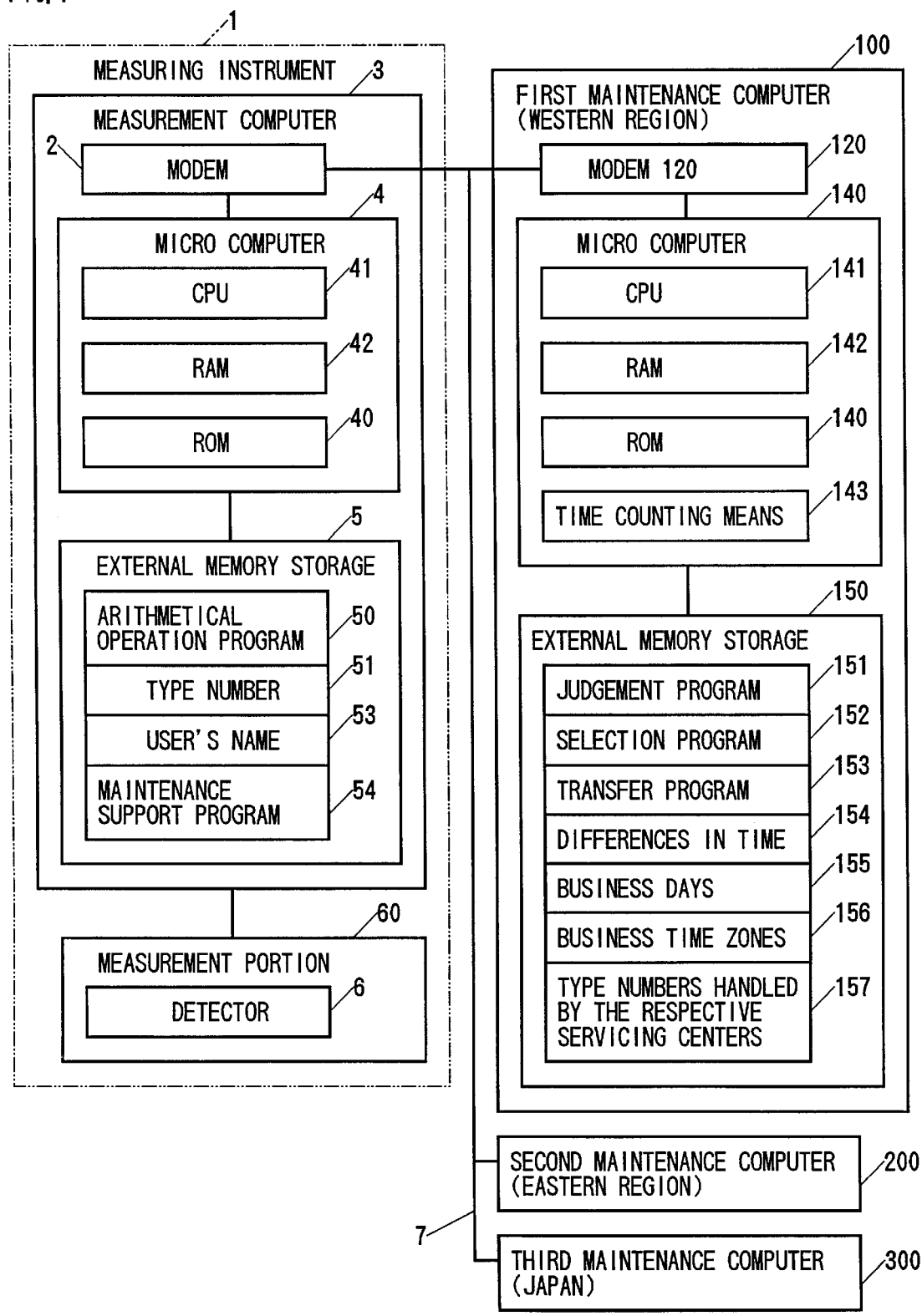
FIG. 1 is a brief configuration view of a maintenance system according to a preferred embodiment of the invention.

In FIG. 1, there is a measuring instrument 1 at a user located in the western part of the United States of America. There are a plurality of maintenance computers 100, 200, and 300 at the maker. These maintenance computers 100, 200, and 300 are, respectively, provided at servicing centers at respective regions whose time zones sequence are different from each other. For example, a first maintenance computer 100 is provided at a servicing center in the western region of the United States of America, a second maintenance computer 200 is provided at a servicing center in the Eastern part of the United States, and a third maintenance computer 300 is provided at a service center in Japan. Furthermore, the respective maintenance computers 100, 200, and 300 are of the same construction. The following description is given of the first maintenance computer 100 as the representative. The measuring instrument 1 and maintenance computers 100, 200, and 300 at the respective servicing centers, respectively, have a modem 2 and a modem 120. They are connected to each other via the corresponding modems 2, 120 and a public line 7 so that transmission and receiving can be carried out between them.

The measuring instrument 1 has a measurement portion 60 in which a detector 6 is incorporated, and a measurement computer 3. The detector 6 is, for example, an infrared ray detector, which detects an object to be measured and outputs a detected value. The measurement portion 60 is, for example, an infrared ray gas analysis meter, which is provided with a measurement cell in which the detector 6 is incorporated, and an introduction channel through which gas to be measured, and an object to be measured, is introduced into the measurement cell. Furthermore, the infrared ray gas analysis meter has a circuit by which the detected value coming from the detector 6 is digital/analog converted or thinned, and outputs the detected value consisting of digital figures to the measurement computer 3.

The measurement computer 3 is provided with a micro computer 4 and a peripheral memory unit 5 connected to the micro computer 4 via an interface (not illustrated). The micro computer 4 has a CPU 41, a ROM 40, and a memory 42. The arithmetical operation program 50, the type of the measuring instrument 1 consisting of the type number 51 of the corresponding measuring instrument 1, user's name 53, and maintenance support program 54 are stored in the memory in the abovementioned peripheral memory unit 5. The arithmetical operation program 50 is loaded from the peripheral memory unit 5 into the memory 42. The memory 42 stores the arithmetical operation program 50 to calculate a measurement value by the detected value. The CPU 41 promptly reads out the content of the memory 42, calculates a measurement value on the basis of the detected value outputted from the detector 6 and the arithmetical operation program 50, and, at the same, time controls a statistical process of the measurement value (data processing such as depicting, tabulating, etc.) and operations of the measurement portion 60.

The maintenance support program 54 is started by a user in a case where maintenance becomes necessary. As the maintenance support program 54 is started, the CPU 41 reads out the type number 51 and user's name 53 from the peripheral memory unit 5 and transmits the information to the first maintenance computer 100 by using the modem 2, along with information requesting the maintenance required and conditions of the problem. Furthermore, the information requesting the maintenance is established in advance in the maintenance support program 54.

The first maintenance computer 100 has a micro computer 140, a peripheral memory unit 150 and a modem 120, which are, respectively, connected to the micro computer 140 via an interface (not illustrated). The micro computer 140 is provided with a CPU 141, a memory 142, a ROM 140, and a time counting means 143. The time counting means 143 comprises, for example, a time counting circuit like a clock incorporated in the first maintenance computer 100 and is set to the present year, month, day and time of the corresponding servicing center (the western region of the United States of America) and outputs the corresponding year, month, day and time.

The peripheral memory unit 150 stores various programs such as judgement program 151, selection program 152 and transfer program 153, and various types of data such as time differences 154, business days 155, business time zones 156, and type name 157 which can be handled (treated) by the respective servicing centers (servicing centers in Japan, the western and eastern regions of the United States of America). The type name 157 which can be handled by the respective servicing centers consists of, for example, the type numbers of a measuring instrument 1 which can be handled by the respective servicing centers, and a part thereof.

The business days 155 and business time zones 156 are such that days, and time zones of the corresponding days and months and months during which a request for maintenance from a user can be treated are stored with respect to each of the servicing centers. The time differences 154 mean the time differences between the servicing center in the corresponding region and those in other regions.

The judgement program 151 is started when receiving information requesting maintenance from a measurement computer 3 of a user. As the judgement program 151 is started, the CPU 141 receives the present time and date from the time counting means 143 as the time and date when the CPU 141 receives the information, compares the time and date with the business days 155 and business time zones 156 of the corresponding servicing center, which are read out from the peripheral memory unit 150, and judges whether or not the corresponding servicing center can perform the maintenance.

The selection program 152 is started in a case where the judgement program 151 judges that the corresponding servicing center can not carry out the maintenance, and is to select another servicing center, which is able to perform the maintenance, on the basis of the information regarding the type number 51 and the user's name 53 of the measuring instrument 1. The transfer program 153 transfers the information received from the measurement computer 3 to another maintenance computer 200 or 300 of another servicing centers.

The second maintenance computer 200 or the third maintenance computer 300 is constructed the same as the first maintenance computer 100, wherein the time counting means is set so as to output the present time and date corresponding to the respective corresponding regions, and the business days, business time zones and time differences are, respectively, set to the data corresponding to the respective corresponding regions.

Figure 2:
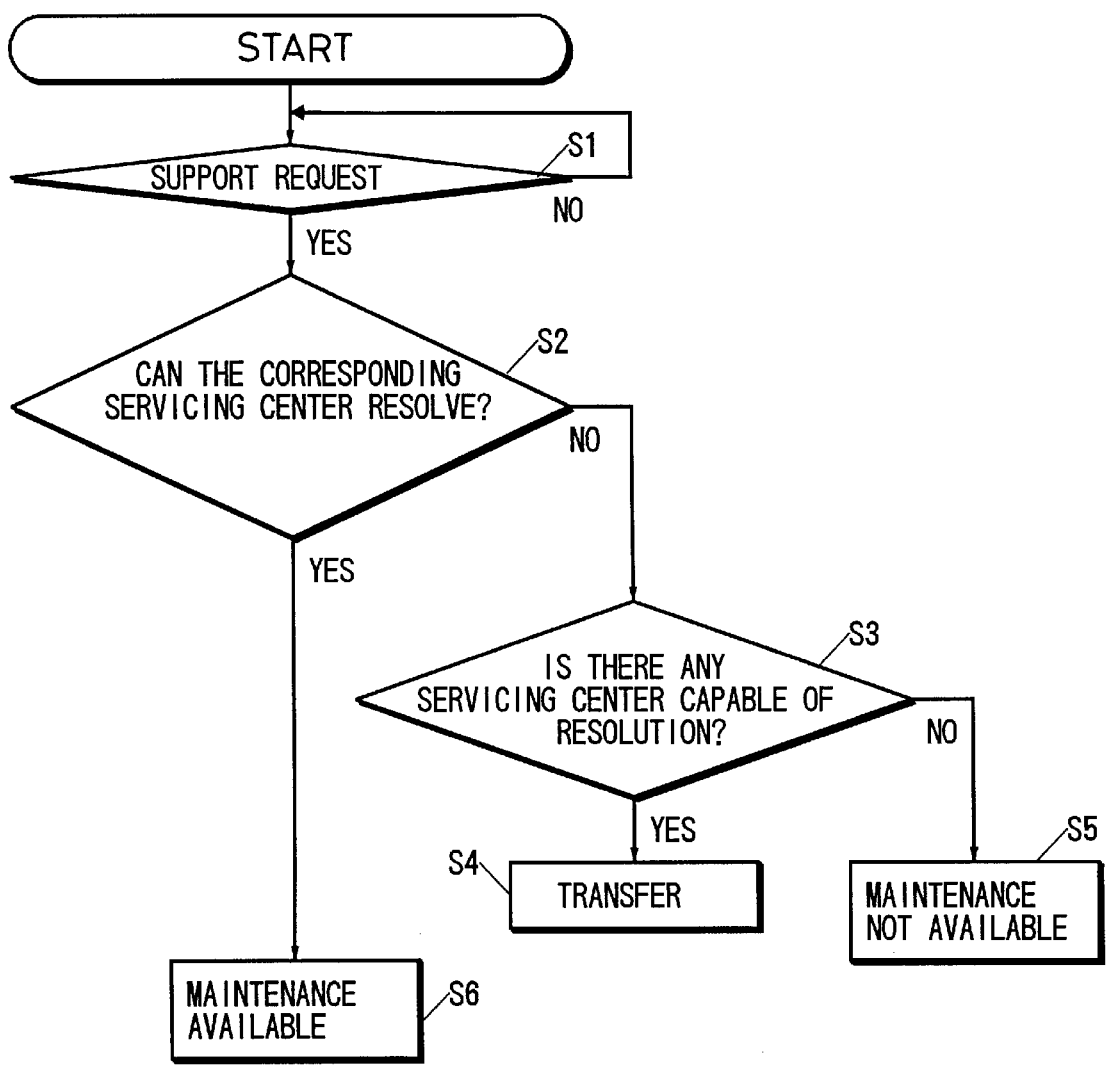
FIG. 2 is a flow chart showing a maintenance method.

Next, a description is given of a method for maintenance of a measuring instrument with reference to the flow chart in FIG. 2.

When maintenance becomes necessary, a user operates the measurement computer 3 and starts the maintenance support program 54. As the maintenance support program 54 is started, the CPU 41 reads out the type number 51 and the user's name 53 of the measuring instrument from the peripheral memory unit 5 and transmits the information to the first maintenance computer 100 in the western region along with the information requesting the maintenance. On the other hand, in the first maintenance computer 100, the control system of maintenance shown in FIG. 2 is started, wherein in Step S1, when the information requesting maintenance is received from the user, and the process goes to Step S2.

In Step S2, the judgement program 151 is started, and the CPU 141 receives the present time and date from the time counting means 143, compares the time and date, that is, the time and date when the CPU 141 receives, with the business days 155 and business time zones 156, which are read out from the peripheral memory unit 150, and judges whether or not the corresponding servicing center (the western region)

can perform the maintenance. As a result of the judgement, when it is judged that the maintenance can be carried out at the corresponding servicing center, the process goes to Step S6, wherein an appointed process is carried out. On the other hand, when it is judged in Step S2 that the corresponding servicing center is not able to carry out the maintenance, the process goes to Step S3.

In Step S3, the selection program 152 is executed, and the CPU 141 arithmetically operates the present time and date of the respective regions on the basis of the present time and date, and the time differences 154 of the respective regions, which are read out from the peripheral memory unit 150. Next, the CPU 141 reads out the business days 155 and business time zones 156 of the other regions from the peripheral memory unit 150, and searches for a servicing center from the business days 155 and business time zones 156 where it is possible to carry out maintenance, on the basis of the business days 155 and business time zones 156, and the present time and date of the respective regions. Furthermore, the CPU 141 reads out the type number and name 157, which can be handled in the respective regions, from the peripheral memory unit 140, and searches for a servicing center which is able to service a measuring instrument of the type and name. On the basis of a result from the searching, the process goes to step S4 if there is a servicing center which is during the business time and date and is able to perform maintenance of the measuring instrument of the type and name. If no servicing center which can perform the maintenance is available, the process goes to Step S5.

In Step S4, the transfer program 153 is executed, and the CPU 141 transmits the information (type number 51 and the user's name 53 of a measuring instrument 1 and information requesting maintenance), which is received from the measurement computer 3, to a maintenance computer 200 or 300 of another servicing center which is able to perform the maintenance.

If there are a plurality of servicing centers where the maintenance can be carried out, the servicing center which is most suitable for resolving the trouble is selected on the basis of the type number, etc., of the corresponding measuring instrument 1.

On the other hand, in Step S5, the first maintenance computer 100 transmits information to the measurement computer 3 that there is no servicing center, which can carry out the maintenance, at the moment.

Furthermore, a preferable configuration of a personal computer, etc., actually used is shown in Table 1.

TABLE 1

| Component | Developer | Model | Specification |
|---|---|---|---|
| Personal computer | IBM | | |
| CPU | INTEL | Pentium 2 | 300 MHz |
| RAM | IODATA | SIMM | 64 Mbytes |
| External memory storage | Quantum | | 2 Gbytes |
| Modem | Panasonic | | 56 kbps |
| OS | | Windows 95 or NT | |

What is claimed is:

1. A method for maintenance of a measuring instrument which has a detector for detecting an object to be measured and outputting a detected value, and a measurement computer, and which outputs a measured value being the result of a measurement on the basis of the detected value coming from said detector;

said method comprising the steps of:

a first transmitting step for transmitting information of a type of said measuring instrument and requesting maintenance from said measurement computer to a first of a plurality of maintenance computers, respectively, installed at a plurality of servicing centers in compliance with an appointed maintenance support program;

a judging step by which said first maintenance computer judges, in compliance with a judgment program, whether or not the corresponding servicing center is able to perform maintenance, on the basis of the time and date when said information is received;

a selecting step by which, in a case where said corresponding servicing center is not able to execute maintenance, said first maintenance computer selects a second servicing center, which is able to execute the maintenance, from said plurality of servicing centers on the basis of the time and date and the type of said measuring instrument in compliance with a selection program according to the results of said judgment; and a second transmitting step by which said first maintenance computer transmits the information received from said measurement computer to a second maintenance computer at said second servicing center selected above in compliance with a transfer program.

2. A method for maintenance of a measuring instrument as set forth in claim 1, wherein information regarding the type of the measuring instrument and user's name is stored in advance in said measurement computer;

the memory information regarding the type and user's name of said measuring instrument is read out in compliance with said maintenance support program prior to said first transmitting step; and said read out memory information is transmitted in said first transmitting step along with information requesting said maintenance.

3. A method for the maintenance of a measuring instrument as set forth in claim 1, wherein said plurality of maintenance computers store the time differences between a region where said first maintenance computer is installed and a region where said second maintenance computer is installed, and store business days and time zones in which the servicing centers where said respective first and second maintenance computers are installed is in operation; and said maintenance computers carry out said judgment and selection on the basis of said time differences, business days and time zones, and the time and date on which said information is transmitted.

4. A method for maintenance of a measuring instrument as set forth in claim 1, wherein said measurement computer has an arithmetical operation program to obtain said measured value from said detected value, by which said measured value is obtained from said detected value in compliance with said arithmetical operation program.

5. A method for maintenance of a measuring instrument as set forth in claim 1, wherein said measurement computer processes data regarding said measured value.

6. A method for maintenance of a measuring instrument as set forth in claim 1, wherein said measurement computer controls the corresponding measuring instrument.

7. A method for maintenance of a measuring instrument as set forth in claim 1, wherein said measurement computer arithmetically operates said measured value, processes data, and controls the corresponding measuring instrument.

8. A method for maintenance of a measuring instrument as set forth in claim 1, wherein a personal computer is used as the measurement computer and as the maintenance computers.

9. A method for maintenance of a measuring instrument in which a measuring instrument having a detector which detects an object to be measured and outputs a detected value, and a measurement computer which outputs a measured value being the result of the measurement on the basis of the detected value coming from said detector, and a plurality of maintenance computers, respectively, installed in a plurality of servicing centers and controlling said measuring instrument, are installed in advance in such a state where communication is enabled there between via a remote communication means, and maintenance of said measuring instrument is carried out by said plurality of maintenance computers via said remote communication means, said method comprising the steps of:

a first transmitting step for transmitting information of a type of said measuring instrument and requesting maintenance from said measurement computer to a first of the maintenance computers, respectively, installed in said plurality of servicing centers;

a judging step by which the first maintenance computer judges whether or not the corresponding servicing center is able to perform maintenance, on the basis of the time and date when said information is received;

a selecting step by which, in a case where said corresponding servicing center is not able to execute maintenance, said first maintenance computer selects a second servicing center, which is able to execute the maintenance, from said plurality of servicing centers on the basis of the time and date and the type of said measuring instrument in compliance with an appointed program according to the results of said judgment; and a second transmitting step by which said first maintenance computer transmits the information received from said measurement computer to a second maintenance computer at said second servicing center selected above.

* * * * *